United States Patent [19]

Böckmann et al.

[11] 3,875,112

[45] Apr. 1, 1975

[54] AROMATIC POLYCARBONATES WITH ALIPHATIC HYDROXYL GROUPS

[75] Inventors: August Böckmann; Dieter Margotte; Hans Rudolph, all of Krefeld-Bockum; Hugo Vernaleken, Krefeld, all of Germany

[73] Assignee: Bayer Aktiengesellschaft, Leverkusen, Germany

[22] Filed: Apr. 19, 1972

[21] Appl. No.: 245,604

[30] Foreign Application Priority Data
Apr. 23, 1971 Germany............................ 2119775

[52] U.S. Cl. ............ 260/47 XA, 260/49, 260/63 R, 260/50, 260/75 R, 260/77.5 D, 260/77.5 AP
[51] Int. Cl............................................. C08g 17/13
[58] Field of Search .............................. 260/47 XA

[56] References Cited
UNITED STATES PATENTS

| 3,094,508 | 6/1963 | Butterworth et al. .......... 260/47 XA |
| 3,207,814 | 9/1965 | Goldberg ....................... 260/47 XA |
| 3,544,514 | 12/1970 | Schnell et al. ................. 260/47 XA |

FOREIGN PATENTS OR APPLICATIONS

| 885,442 | 12/1961 | United Kingdom .......... 260/47 XA |
| 715,142 | 8/1965 | Canada ......................... 260/47 XA |

Primary Examiner—Wilbert J. Briggs, Sr.
Attorney, Agent, or Firm—Lawrence S. Pope

[57] ABSTRACT

Aromatic polycarbonates with functional, aliphatic hydroxyl groups are provided and a process for preparing them in a phase boundary reaction carried out at a pH value of 8 – 13.5, preferably 12 – 13.

14 Claims, No Drawings

AROMATIC POLYCARBONATES WITH ALIPHATIC HYDROXYL GROUPS

Aliphatic polycarbonates with aliphatic hydroxyl groups are known and can be manufactured, according to Deutsche Offenlegungsschrift (German published specification) No. 1,595,446, by reaction of aliphatic diols with phosgene. A further process for the manufacture of aliphatic polycarbonates with aliphatic hydroxyl groups consists of the reaction of a diol with diphenylcarbonate by the transesterification process (Deutsche Offenlegungsschrift (German published specification) No. 1,915,908).

These polycarbonates can be modified in diverse ways by reactions at the aliphatic hydroxyl groups and are suitable for use as polyol components for the manufacture of linear, branched or crosslinked block copolycarbonates, such as polyester-carbonates and polyurethane-carbonates. As a rule, however, polymers manufactured using aliphatic polycarbonates have a low resistance to heat distortion.

While the use of aromatic polycarbonates with aromatic hydroxyl groups as the polyol component for the manufacture of polyester-carbonates or polyurethane-carbonates yields products resistant to heat distortion, the aromatic hydroxyl groups show a different reaction behavior from the aliphatic hydroxyl groups, for example in esterification reactions. A further disadvantage of these products is the fact that the structural units formed with the aromatic hydroxyl groups, such as ester units or urethane units, easily undergo thermal reverse decomposition, in contrast to the structural units formed from aliphatic hydroxyl groups.

It is therefore an object of this invention to provide aromatic polycarbonates which contain aliphatic hydroxyl functional groups and a method for preparing them which are devoid of the foregoing disadvantages.

Still another object of this invention is to provide polyols which are eminently suitable for the production of polyester carbonates, polyether carbonates, polyurethane carbonates and the like which have high heat distortion resistances and a process for preparing them.

The foregoing objects and others which will become apparent from the following description are accomplished in accordance with this invention, generally speaking, by providing aromatic polycarbonates which contain aliphatic hydroxyl groups by reacting phosgene with compounds containing at least two phenolic hydroxyl groups and at least one aliphatic hydroxyl group at a pH of from 8 to 13.5, preferably 12 to 13. The compound containing phenolic and aliphatic hydroxyl groups can be used either alone or in admixture with any other diols known to be suitable in the preparation of polycarbonates generally.

It is known to manufacture aromatic polycarbonates by the condensation of aromatic dihydroxy compounds with diphenylcarbonate by the melt process (Deutsche Auslegeschrift, German published specification No. 1,026,958). However if a mixture of aromatic dihydroxy compounds and compounds which contain both one or more aromatic hydroxyl groups and one or more aliphatic hydroxyl groups in the molecule is reacted with a less than equivalent amount of diphenylcarbonate in this process, mixed aliphatic/aromatic polycarbonates are formed, the end groups of which are mixed aliphatic and aromatic hydroxyl groups.

It is also known to manufacture aromatic polycarbonates by a reaction of aromatic dihydroxy compounds with phosgene according to the phase boundary process (German Pat. No. 971,790). If a mixture of aromatic dihydroxy compounds and compounds which contain both one or more aromatic hydroxyl groups and one or more aliphatic hydroxyl groups in the molecule is reacted with phosgene according to this process, a mixed aliphatic-aromatic polycarbonate with both aromatic and aliphatic hydroxyl groups is again obtained (see also Deutsche Auslegeschrift, German published specification, No. 1,262,598).

It is therefore surprising that in the process of this invention in which the pH is accurately controlled, the aliphatic hydroxyl groups do not react and that their functionality is entirely preserved.

Any suitable aromatic hydroxyl compounds which contain both two or more aromatic hydroxyl groups and one or more aliphatic hydroxyl groups in the molecule can be used in the practice of this invention including, for example:

a. Ethers of at least trihydric aliphatic alcohols with polyhydric phenols, which contain at least one aliphatic hydroxyl group and at least two aromatic hydroxyl groups, such as bis-ethers of 1 mol of a trihydric or tetrahydric aliphatic alcohol such as glycerine, pentaerythritol, 1, 1, 1-trimethylolpropane and the like with 2 mols of a dihydric phenol, such as those listed in U.S. Pat. Nos. 3,028,365 and 2,999,835, hydroquinone, resorcinol, 4, 4'-dihydroxydiphenyl, bis-(4-hydroxyphenyl) alkanes, -ethers, -sulphides, -sulphones, -ketones and the like and derivatives of these phenols which are halogenated and/or alkylated in the nucleus.

b. Aromatic compounds with two aromatic hydroxyl groups and at least one nuclear-bonded hydroxyalkyl group, especially compounds with two benzene nuclei which possess one aromatic hydroxyl group and one nuclear-bonded hydroxyalkyl group per benzene nucleus, preferably a methylol group, such as those listed in U.S. Pat. Nos. 3,028,365 and 2,999,835, 3,3'-dihydroxymethyl-4,4'-dihydroxydiphenyl, bis-(3, hydroxymethyl-4-hydroxyphenyl)-alkanes, -cycloalkanes, -ethers, -sulphides, -sulphones, -ketones and the like and derivatives thereof which are halogenated and alkylated in the nucleus.

To synthesize polycarbonates in which solely the two end groups carry aliphatic hydroxyl groups, compounds which contain one or more aliphatic hydroxyl group but only one aromatic hydroxyl group in the molecule are preferentially employed in addition to aromatic dihydroxy compounds. These substances act as chain stoppers. Any such suitable substances may be used including, for example:

c. Monohydric phenols with nuclear-bonded hydroxyalkyl groups such as 4-hydroxymethylphenol, 4-hydroxyethylphenol, 2,6-dihydroxymethylphenol and the like.

d. Hydroxyalkyl-ethers of polyhydric phenols with a non-etherified aromatic hydroxyl group such as mono-($\beta$-hydroxyethyl)-ethers, mono-($\beta$-hydroxypropyl)-ethers of the dihydric phenols mentioned under (a), the bis-($\beta$-hydroxyethyl)-ethers and bis($\beta$-hydroxypropyl)-ethers of $\alpha,\alpha'$-bis-(hydroxyaryl)xylenols of the formula

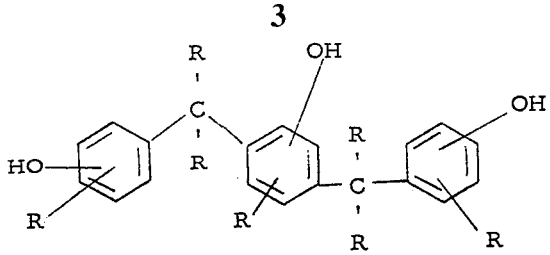

in which R denotes identical or different alkyl groups having 1–3 carbon atoms.

e. Monoethers of 1 mol of the polyhydric aliphatic alcohols mentioned under (a) and 1 mol of the dihydric phenols also mentioned under (a).

The compounds listed, which contain both one or more aromatic hydroxyl groups and one or more aliphatic hydroxyl groups in the molecule, can be manufactured in accordance with processes which are in themselves known, for example by reaction of aromatic dihydroxy compounds or trihydroxy compounds with oxiranes such as, for example, ethylene oxide, propylene oxide, epichlorohydrin and the like or with alkyleneglycol carbonates such as, for example, ethyleneglycol carbonate, or by reaction of aromatic dihydroxy or trihydroxy compounds with halogenoalkyl compounds containing hydroxyl groups, such as, for example, 1,3-dibromo-2,2-dihydroxymethylpropane, 1,3-dibromo-2-ethyl-2-hydroxymethylpropane and the like.

Any aromatic dihydroxy compounds can be used in admixture with compounds which contain both aromatic and aliphatic hydroxyl groups in the molecule in the practice of this invention including, for example, those listed in U.S. Pat. Nos. 3,028,365 and 2,999,835, hydroquinone, resorcinol, 4,4'-dihydroxydiphenyl, bis-(4-hydroxyphenyl)-alkanes, -cycloalkanes, -ethers, -sulphides, -sulphones, -ketones and the like as well as the compounds which are halogenated and/or alkylated in the nucleus and $\alpha,\alpha,\alpha',\alpha'$-tetramethyl-$\alpha,\alpha'$-bis-(p-hydroxyphenyl)-xylene and the like.

The process of this invention permits the manufacture of a large number of different aromatic polycarbonates which contain aliphatic hydroxyl groups. The use of a mixture of aromatic dihydroxy compounds with compounds which contain both an aromatic and one or more aliphatic hydroxyl groups in the molecule yields aromatic polycarbonates which have functional aliphatic hydroxyl end groups. The use of compounds which contain both two aromatic hydroxyl groups and one or more aliphatic hydroxyl groups in the molecule, in combination with conventional chain stoppers such as monohydric phenols, especially p-tert.-butylphenol, yields aromatic polycarbonates which contain aliphatic hydroxyl groups distributed over the polycarbonate chain. The use of a mixture of aromatic dihydroxy compounds and compounds which contain both two aromatic and one or more aliphatic hydroxyl groups in the molecule and compounds which contain both one aromatic and one or more aliphatic hydroxyl groups in the molecule yields aromatic polycarbonates which contain aliphatic hydroxyl groups both distributed over the chain and as end groups.

In these aromatic polycarbonates, the number of the aliphatic hydroxyl groups can be modified within wide limits, depending on what concentrations of compounds carrying aliphatic hydroxyl groups are employed. It is particularly advantageous to use a mixture of 2,2-bis-(4-hydroxyphenyl)-propane(bisphenol A) and 2-(4-hydroxyphenyl)-2-(4-$\beta$-hydroxyethyloxyphenyl)-propane(monohydroxyethyl ether of bisphenol A). The mixture can easily be manufactured by partial oxyethylation of bisphenol A.

The process of this invention makes it possible to manufacture branched aromatic polycarbonates with aliphatic hydroxyl groups through the conjoint use of aromatic trihydroxy and tetrahydroxy compounds.

The products of the process of this invention can be used as diol components or polyol components and they can be esterified and etherified and employed, for example, in the production of polyester-carbonates and polyurethane-carbonates. The products of this invention can also be reacted with functional carboxylic acids such as, for example, acrylic acid, maleic acid and the like and they may be etherified for example via the known reaction with N-methylol compounds.

The invention is further illustrated but is not intended to be limited by the following examples in which all parts and percentages are by weight unless otherwise specified.

EXAMPLE 1

52 parts of a mixture of 3 mols of 2,2-bis-(4-hydroxyphenyl)-propane (bisphenol A) and 1 mol of mono-($\beta$-hydroxyethyl)-ether of bisphenol A together with 260 parts of a 9.1 percent strength aqueous sodium hydroxide solution and 700 parts of methylene chloride are reacted with 20 ml of phosgene in accordance with the phase boundary process. The pH value is maintained at 13 by the addition of aqueous sodium hydroxide solution as required. After passing in the phosgene, 4 ml of a 3 percent strength aqueous triethylamine solution are added and the mixture is subsequently stirred for one-half hour.

Thereafter, the organic phase is separated from the sodium hydroxide solution and washed twice with approximately 5 percent strength phosphoric acid and then with water until neutral and free of electrolyte. The resulting polycarbonate is isolated either by evaporating off the methylene chloride or by precipitation in methanol. The polycarbonate thus manufactured has a relative viscosity of $\eta_{rel} = 1.087$ (measured in methylene chloride at 25° and at a concentration of 5 g/1,000 ml) an OH number of 59 and phenolic OH of 0.06. Calculated OH number: 53.5.

Manufacture of the mono-($\beta$-hydroxyethyl)-ether of Bisphenol A (I).

267 parts of $\beta$-hydroxyethyl-p-isopropenylphenyl-ether and 156 parts of phenol are warmed together to 50°C. 0.5 part of the concentrated hydrochloric acid are then added, as a result of which the temperature rises to 93°C. The mixture is stirred for one-half hour at 90°–100°C. Thereafter, unreacted phenol (29 g) are distilled off. 270 parts of (I), melting point 134°–176°, are obtained from the residue by twice recrystallizing from acetic acid ethyl ester.

The mixture of 3 mols of bisphenol A and 1 mol of mono-($\beta$-hydroxyethyl)-ether of bisphenol A used in Example 1 is manufactured as follows:

912 parts of bisphenol A (4 mols) and 4.4 ml of triethylamine are heated to 140°C. (under $N_2$); thereafter, 44 parts of ethylene oxide are passed into the melt. Examination by gas chromatography shows that the mixture consists of 3 mols of bisphenol A and 1 mol of mono-($\beta$-hydroxyethyl)-ether of bisphenol A.

EXAMPLE 2

52 parts of a mixture of 3 mols of bisphenol A and 1 mol of mono-($\beta$-hydroxyethyl)-ether of bisphenol A, 260 parts of a 9.1 percent strength aqueous sodium hydroxide solution, 4.6 parts of 2,6-di-(2-hydroxy-5-methyl-benzyl)-p-cresol and 700 parts of methylene chloride are reacted with 20 ml of phosgene using the phase boundary process described in Example 1.

The resulting polycarbonate has a relative viscosity $\eta_{rel} = 1.065$; OH number = 51, phenolic OH = 0.04 percent; calculated OH number = 48.

The polycarbonates manufactured in this way are polyfunctional compounds which can easily be crosslinked with diisocyanates such as, for example, any of those listed in U.S. Pat. No. 3,350,362 and preferably tolylene diisocyanate.

The 2,6-di-(2-hydroxy-5-methyl-benzyl)-p-cresol employed is described in Ang. Chem. 46, 251, 1933 and U.S. Pat. No. 2,841,627.

EXAMPLE 3

61.5 parts of a mixture of 4 mols of 2,2-bis-(3-methyl-4-hydroxyphenyl)-propane and 1 mol of mono-($\beta$-hydroxyethyl)-ether of 2,2-bis-(3-methyl-4-hydroxyphenyl)-propane, 260 parts of a 9.1 percent strength aqueous sodium hydroxide solution and 700 parts of methylene chloride are reacted with 22 ml of phosgene using the phase boundary process described in Example 1.

The resulting polycarbonate has a relative viscosity $\eta_{rel} = 1.095$; OH number = 34; phenolic OH = 0.09 percent.
Calculated OH number = 39.

The manufacture of the mixture of 4 mols of 2,2-bis-(3-methyl-4-hydroxyphenyl)-propane (II) and 1 mol of mono-($\beta$-hydroxyethyl)-ether of 2,2-bis-(3-methyl-4-hydroxyphenyl)-propane is analogous to the manufacture of the mixture used in Example 1 by reacting 5 mols of (II) with 1 mol of ethylene oxide. The end product had an OH number of 420; calculated, 421.

EXAMPLE 4

117.4 parts of a bis-ether of 1 mol of glycerine and 2 mols of bisphenol A are reacted as described in Example 1 with 260 parts of a 9.1 percent strength aqueous sodium hydroxide solution, 7.3 parts of p-tert.-butylphenol, 700 parts of methylene chloride and 22 ml of phosgene.

The polycarbonate obtained has a relative viscosity of $\eta_{rel}$ 1.070, OH number = 98, phenolic OH: 0.2 percent, calculated OH number = 104.

The manufacture of the glycerine-bis-ether of bisphenol A is described in CA 63, 11,498e = Netherlands specification No. 6,413,493.

EXAMPLE 5

62.3 parts of a mixture of 3 mols of bisphenol A and 1 mol of the gylcerine-bis-ether of bisphenol A are reacted as described in Example 1 with 260 parts of a 9.1 percent strength aqueous sodium hydroxide solution, 7.5 parts of p-tert.-butyl-phenol, 700 parts of methylene chloride and 22 ml of phosgene.

The polycarbonate obtained has a relative viscosity of $\eta_{rel} = 1.075$, OH number = 37 and phenolic OH = 0.1 percent; calculated OH number = 39.

The mixture of 3 mols of bisphenol and 1 mol of glycerine-bis-ether of bisphenol A was manufactured as follows:

1,140 parts of bisphenol A are slowly mixed with 92.5 parts of epichlorohydrin at 160°C. Thereafter, 56 parts of KOH are added dropwise as a 60 percent strength aqueous solution; at the same time, water is distilled off. The reaction mixture is dissolved in acetone. Insoluble KCl was filtered off. The filtrate is concentrated.

Found OH number 426, calculated 422.

EXAMPLE 6

45.6 parts of bisphenol A, 3.41 parts of a 1,1,1-trimethlol-propane-monoether of resorcinol and 2 parts of p-tert.-butylphenol are dissolved in 38 parts of a 45 percent strength sodium hydroxide solution, 250 parts of water and 700 parts of methylene chloride. 22 ml of phosgene are then passed in and the pH value is maintained at 13 as described in Example 1 by dropwise addition of sodium hydroxide solution when required. The product is also worked up as described in Example 1 and has a relative viscosity of $\eta_{rel} = 1.246$, OH number = 40, phenolic OH = 0.1 percent; calculated OH number = 37.

Manufacture of the 1,1,1-trimethylolpropane-monoether of resorcinol (III).

111 parts of resorcinol are dissolved in 300 ml of $H_2O$ at 100°C.; (a) 40 parts of NaOH in 50 ml of water and (b) 197 parts of 2-ethyl-3-bromomethylpropanediol-1.3 (CA 49, 8977d) in 500 ml of $H_2O$ are simultaneously added dropwise to this solution. After 2 hours water is distilled off and the residue is taken up in ethanol and the solution filtered. Distillation of the concentrated filtrate yields 80 g of (III), boiling point$_{0.4}$ 106°–107°.

Analysis ($C_{12}H_{18}O_4$) (226),
found 28.5%, OH number 371
calculated 28.4%, OH number 343

EXAMPLE 7

76.5 parts of a mixture of 2 mols of bisphenol A, 1 mol of mono-($\beta$-hydroxyethyl)-ether of bisphenol A and 1 mol of glycerine-bis-ether of bisphenol A are reacted with 260 parts of a 9.1 percent strength aqueous sodium hydroxide solution, 700 parts of methylene chloride and 22 ml of phosgene as described in Example 1. The polycarbonate obtained has a relative viscosity $\eta_{rel} = 1.080$, OH number = 76, phenolic OH = 0.1%, calculated OH number = 85.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What we claim is:

1. A process for the production of an aromatic polycarbonate comprising reacting phosgene with one or more compounds having at least two aromatic hydroxyl groups and with one or more compounds having one aromatic hydroxyl group with the proviso that at least one compound having one or at least two aromatic hydroxyl groups also has at least one aliphatic hydroxyl group, by interfacial condensation while maintaining the pH of the resultant reaction mixture in the range of 8 to 13.5 whereby substantially all the aliphatic hydroxyl groups remain unreacted.

2. The process of claim 1 wherein the pH is maintained in the range of 12 to 13.

3. The process of claim 1 wherein the phosgene is reacted with a mixture of a compound containing, per molecule, at least two aromatic hydroxyl groups and at least one aliphatic hydroxyl group and a dihydroxy compound containing, per molecule, two aromatic hydroxyl groups.

4. The process of claim 1 wherein the phosgene is reacted with a mixture of a compound containing, per molecule, one aromatic hydroxyl group and at least one aliphatic hydroxyl group and a dihydroxy compound containing, per molecule, two aromatic hydroxyl groups.

5. The process of claim 1 wherein the phosgene is reacted with a mixture of (a) a compound containing, per molecule, at least two aromatic hydroxyl groups and at least one aliphatic hydroxyl group, (b) a compound containing, per molecule, one aromatic hydroxyl group and at least one aliphatic hydroxyl group and a dihydroxy compound containing, per molecule, two aromatic hydroxyl groups. (c) a 6. The process of claim 3 wherein the phosgene is reacted with a mixture of (a) the glycerin bis-ether of 2,2-bis-(4-hydroxyphenyl)-propane and (b) 2,2-bis-(4-hydroxyphenyl)-propane.

7. The process of claim 4 wherein the phosgene is reacted with a mixture of (a) the mono-($\beta$-hydroxyethyl)-ether of 2,2-bis-(4-hydroxyphenyl)-propane and (b) 2,2-bis-(4-hydroxyphenyl)-propane.

8. The process of claim 5 wherein the phosgene is reacted with a mixture of (a) the glycerin bis-ether of 2,2-bis-(4-hydroxy-phenyl)-propane, (b) the mono-$\beta$-hydroxyethyl)-ether of 2,2-bis-(4-hydroxyphenyl)-propane and (c) 2,2-bis-(4-hydroxyphenyl)-propane.

9. The process of claim 1 wherein one of said compounds reacted with phosgene has at least three aromatic hydroxyl groups.

10. An aromatic polycarbonate produced by the process of claim 1.

11. The process of claim 1 wherein the compound containing at least one aliphatic hydroxyl group is a compound having at least two aromatic hydroxyl groups.

12. The process of claim 11 wherein the phosgene is reacted with the glycerin bis-ether of 2,2-bis-(4-hydroxyphenyl)-propane.

13. The process of claim 1 wherein the polycarbonate produced has a hydroxy value of between about 30 and 100.

14. An aromatic polycarbonate produced by the process of claim 13.

* * * * *

UNITED STATES PATENT AND TRADEMARK OFFICE
CERTIFICATE OF CORRECTION

PATENT NO. : 3,875,112
DATED : April 1, 1975
INVENTOR(S) : August Bockmann; Dieter Margotte; Hans Rudolph and Hugo Vernaleken It is certified that error appears in the above-identified patent and that said Letters Patent are hereby corrected as shown below:

Column 7, line 24, after the word "and" (second occurrence), insert --(c)--;

same column, line 25, "hydroxy" should be --hydroxyl--;

same column, line 26, after the word "groups." delete "(c) a".

Signed and Sealed this ninth Day of December 1975

[SEAL]

Attest:

RUTH C. MASON
Attesting Officer

C. MARSHALL DANN
Commissioner of Patents and Trademarks